US012477218B2

(12) United States Patent
Russo et al.

(10) Patent No.: US 12,477,218 B2
(45) Date of Patent: Nov. 18, 2025

(54) DEVICE, METHOD AND SYSTEM FOR ASSISTED AIMING OF ROADSIDE CAMERAS

(71) Applicant: VIGILANT SOLUTIONS LLC, Livermore, CA (US)

(72) Inventors: Pietro Russo, Melrose, MA (US); Phong Quang Dinh, Ho Chí Minh (VN); Phong Truong Hoai, Ho Chí Minh (VN)

(73) Assignee: VIGILANT SOLUTIONS, LLC, Livermore, CA (US)

( * ) Notice: Subject to any disclaimer, the term of this patent is extended or adjusted under 35 U.S.C. 154(b) by 115 days.

(21) Appl. No.: 18/391,889

(22) Filed: Dec. 21, 2023

(65) Prior Publication Data

US 2025/0211852 A1 Jun. 26, 2025

(51) Int. Cl.
*H04N 23/661* (2023.01)
*H04N 23/60* (2023.01)
*H04N 23/62* (2023.01)
*H04N 23/695* (2023.01)

(52) U.S. Cl.
CPC .......... *H04N 23/661* (2023.01); *H04N 23/62* (2023.01); *H04N 23/64* (2023.01); *H04N 23/695* (2023.01)

(58) Field of Classification Search
None
See application file for complete search history.

(56) References Cited

U.S. PATENT DOCUMENTS

| 9,503,634 | B2 | 11/2016 | Mazzola | |
| 2004/0096084 | A1* | 5/2004 | Tamoto | H04N 7/188 382/104 |
| 2014/0039987 | A1* | 2/2014 | Nerayoff | H04N 7/181 348/148 |
| 2017/0098304 | A1* | 4/2017 | Blais-Morin | H04N 23/60 |
| 2021/0195097 | A1* | 6/2021 | Nikitin | H04N 23/64 |

FOREIGN PATENT DOCUMENTS

KR 101698026 B1 1/2017

OTHER PUBLICATIONS

Shingu, Jun, et al., "Camera Pose Navigation using Augmented Reality", IEEE International Symposium on Mixed and Augmented Reality 2010, Science and Technology Proceedings, Oct. 13-16, Seoul, Korea, IEEE Xplore, Downloaded Dec. 8, 2023.

* cited by examiner

*Primary Examiner* — Heather R Jones
(74) *Attorney, Agent, or Firm* — PERRY + CURRIER INC.

(57) ABSTRACT

A mobile device receives: images acquired by a camera, that depict a road that includes two road markers; and indicators of a marker width, a camera distance from the road, and a camera height. The mobile device provides, at a display screen: an image acquired by the camera; and two virtual road markers at fixed positions on the display screen, the two markers based on the width, distance, and height. The mobile device receives respective indicators of the two markers in the image, that are pinned to the two markers at the display screen in further images received from the camera as the two markers move in the further images, as an orientation of the camera changes. When the respective indicators about align with the two virtual markers overlaid on the further images on the display screen at the fixed positions, the mobile device provides a notification.

16 Claims, 8 Drawing Sheets

DEVICE, METHOD AND SYSTEM FOR ASSISTED AIMING OF ROADSIDE CAMERAS

BACKGROUND OF THE INVENTION

Roadside cameras are becoming more ubiquitous, and, for example, may implement license plate reader functionality with respect to images acquired by the cameras, and/or images acquired by the cameras may be provided to computing devices with license plate reader functionality. However, aiming such cameras at a road, with an orientation that enables images to be acquired where license plates of vehicles are processable, may be challenging, especially along roads where vehicles are not present. Put another way, manual aiming cannot be easily implemented as it is impossible for a technician to determine, merely from an image of an empty road, whether a camera is sufficiently aimed.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
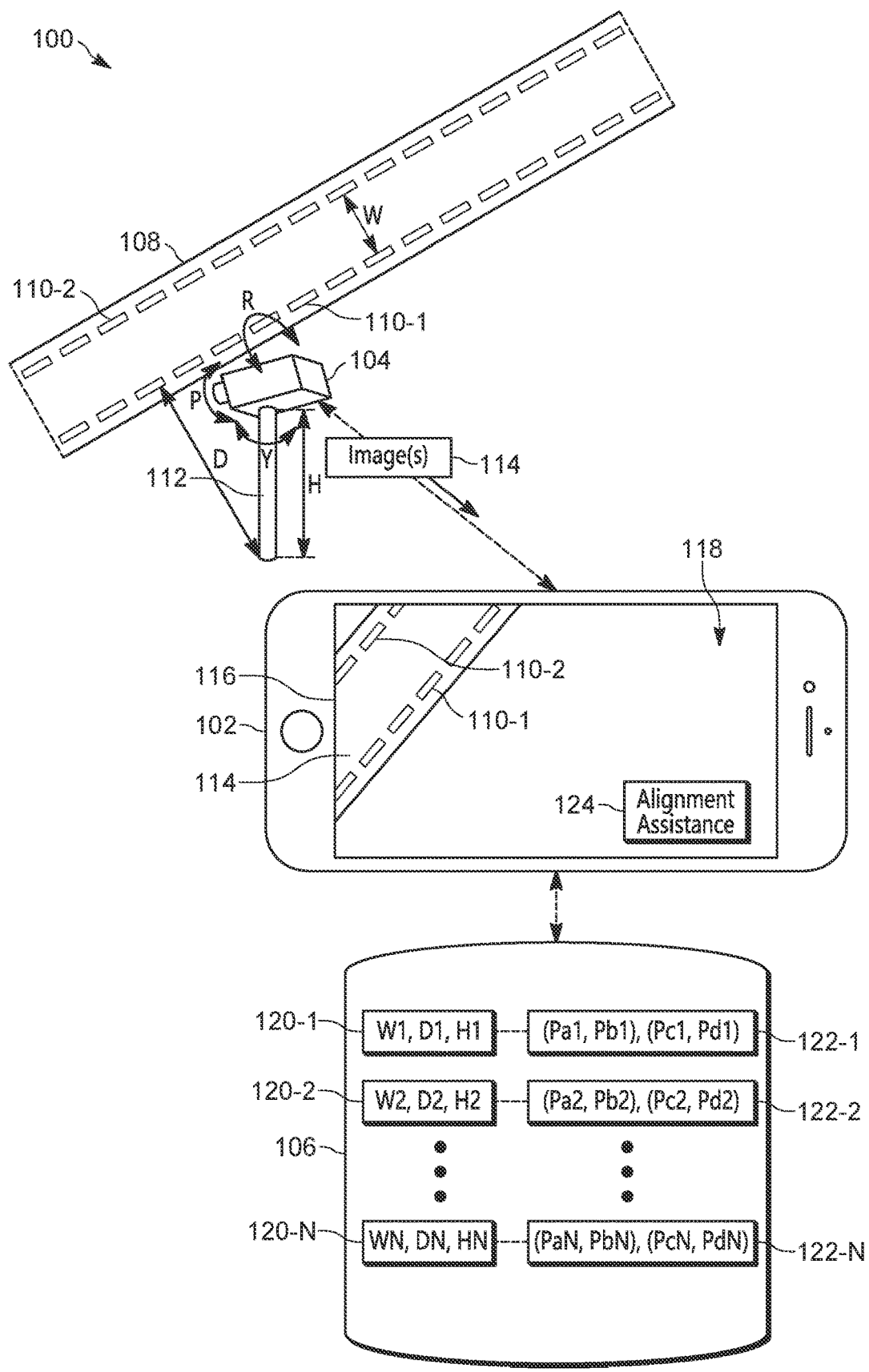
FIG. 1 is a system for assisted aiming of roadside cameras, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Images that depict license plates, that are analyzed by license plate readers, should generally meet certain criteria that may include, but is not limited to: a certain portion of the vehicle around the license plate should be depicted in the images; a size of a depicted license plate should be at least a given size (e.g. such that a character height is greater than a minimum number of pixels, such as 12 pixels, depending on the resolution of the images); the license plate characters should be visible and/or not tilted (and/or tilted within given parameters) or not obscured; and the like, amongst other possibilities. A person installing a camera that is to acquire images that depict license plates, and who may be reviewing images acquired by the camera, cannot determine whether the images meet such criteria. For example, a person cannot determine whether a character height is greater than a minimum number of pixels, such as 12 pixels. Indeed, when no vehicles are travelling along a road where such a camera is being installed, a check of the criteria may not be possible. In addition, the actual location of the vehicle, relative to a camera acquiring images that depict the vehicle, may affect the size of the license plate characters. Relying on a small number of sample images will cause the installation to lack consistency. This may affect the overall LPR recognition quality. Furthermore, as such cameras become more ubiquitous, the number of such cameras that are installed is becoming very large, and hence install times furthermore need to generally be reduced. Thus, there exists a need for an improved technical method, device, and system for assisted aiming of roadside cameras.

An aspect of the present specification provides a method comprising: receiving, at a mobile device, images depicting a road that includes two road markers for guiding traffic, the images acquired by a camera; receiving, at the mobile device, indicators of: a width between the two road markers; a distance of the camera from the road; and a height of the camera; providing, via the mobile device, at a display screen: an image acquired by the camera; and two virtual road markers at fixed positions on the display screen, the two virtual road markers based on the width, the distance, and the height; receiving, at the mobile device, respective indicators of the two road markers in the image, the respective indicators pinned to the two road markers at the display screen in further images received from the camera as the two road markers move in the further images, as an orientation of the camera changes; and when the respective indicators are about aligned with the two virtual road markers overlaid on one or more of the further images on the display screen at the fixed positions, providing, at the mobile device, a notification.

An aspect of the present specification provides a mobile device comprising: a communication interface; a controller; and a computer-readable storage medium having stored thereon program instructions that, when executed by the controller, cause the controller to perform a set of operations comprising: receiving, via the communication interface, images depicting a road that includes two road markers for guiding traffic, the images acquired by a camera; receiving indicators of: a width between the two road markers; a distance of the camera from the road; and a height of the camera; providing, at a display screen: an image acquired by the camera; and two virtual road markers at fixed positions on the display screen, the two virtual road markers based on the width, the distance, and the height; receiving respective indicators of the two road markers in the image, the respective indicators pinned to the two road markers at the display screen in further images received from the camera as the two road markers move in the further images, as an orientation of the camera changes; and when the respective indicators are about aligned with the two virtual road markers overlaid on one or more of the further images on the display screen at the fixed positions, providing a notification.

Each of the above-mentioned embodiments will be discussed in more detail below, starting with example system and device architectures of the system in which the embodiments may be practiced, followed by an illustration of processing blocks for achieving an improved technical method, device, and system for assisted aiming of roadside cameras.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for assisted aiming of roadside cameras. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like, unless otherwise indicated. In particular, communication links that may be wireless are depicted using broken lines.

The system 100 comprises a mobile device 102 communicatively coupled to a camera 104 and a memory 106, for example via respective wireless communication links. As depicted, the camera 104 is mounted by a road 108 that includes two road markers 110-1, 110-2 for guiding traffic along the road 108. The road markers 110-1, 110-2 are interchangeably referred to hereafter, collectively, as the road markers 110 and, generically, as a road marker 110.

In some examples, the camera 104 may comprise a closed circuit television (e.g. CCTV) camera, however the camera 104 may comprise any suitable types of camera that acquires digital images.

As depicted, the road markers 110 comprise respective broken lines (e.g. painted) on the road 108, though the road markers 110 may comprise any suitable format, including, but not limited to, respective solid lines, a combination of a respective broken line and a respective solid line, and the like. Regardless, it is understood that the road markers 110 are generally parallel and separated by a width W, that may correspond to a width of a vehicle that drives on the road 108, though the width W may be wider or narrower than such a vehicle. Regardless, it is understood that vehicles using the road 108 are generally to stay between the road markers 110.

As depicted, the camera 104 is mounted a perpendicular distance D from the road markers 110 (e.g. the closest road markers 110-1) and furthermore is mounted a height H above the road 108 (e.g. on a pole 112). Furthermore, while the camera 104 is in a fixed position at the distance D and the height H, relative to the road 108 and/or the road markers 110, it is understood that an orientation of the camera 104 relative to the road 108 and/or the road markers 110 is adjustable. For example a pitch (P), yaw (Y) and/or roll (R) of the camera 104 may be adjustable due to the camera 104 being attached to the pole 112 by a suitable connector (e.g. such as a three-axis connector, or any suitable combination of connectors). Hence, the orientation of the camera 104 may be adjusted, and later fixed in place via any suitable combination of one or more fasteners.

Such an adjustment may be performed manually by a technician and/or via servo motors, and the like under control of the mobile device 102 via a wireless communication link there between, and the like. In the latter example, while servo motor controls are not depicted at the mobile device 102, they may nonetheless be present.

As depicted, the camera 104 is acquiring one or more images 114 (referred to hereafter for simplicity as the images 114 and/or, generically, as an image 114) that depicts the road 108 as well the two road markers 110. The camera 104 is transmitting the one or more images 114 to the mobile device 102. In particular, it is understood that the mobile device 102 has established a wireless communication link with the camera 104.

The mobile device 102 receives the images 114 and renders the images 114 at a display screen 116. As described herein, the display screen 116 may comprise a touch screen for receiving input corresponding to positions on the display screen 116, however, the mobile device 102 may comprise any suitable input component for receiving input corresponding to positions on the display screen 116.

While as depicted the images 114 are rendered the display screen 116, with the mobile device 102 and the display screen 116 in a landscape orientation, in other examples the images 114 may be rendered at the display screen 116 with the mobile device 102 and the display screen 116 in a portrait orientation.

As used herein, the term render is understood to include generating a visual component by means of a computer program, and displaying such a visual component at a display screen, such as the display screen 116. In particular, the images 114 may be rendered as visual components in a graphic user interface (GUI) 118. In particular, the GUI 118 is programmed to display and/or render the images 114.

Furthermore, the GUI 118 may include, and/or be programmed to display, and/or render, interactive visual components, as described herein. Hence, the mobile device 102 may be configured to render the GUI 118, and detect when interactive visual components thereof are actuated, and/or the GUI 118 may comprise programming instructions that, when the GUI 118 is processed by the mobile device 102, cause the GUI 118 and/or the mobile device 102 to render the various visual components of the GUI 118 at the display screen 116, and detect when interactive visual components thereof are actuated.

Hence, hereafter, when the GUI 118 is described as providing certain visual components, it is understood that that the mobile device 102 and/or the GUI 118 are programmed to display and/or render such visual components at the display screen 116, and when such visual components are interactive and/or actuatable, it is further understood that the mobile device 102 and/or the GUI 118 are programmed to receive input via such interactive and/or actuatable visual components, and perform an associated action in response.

The mobile device 102 is depicted as a cell-phone type mobile device, however the mobile device 102 may comprise any suitable mobile device that may be operated by a user (e.g. a technician installing the camera 104) and that includes a display screen (e.g. the display screen 116). Alternatively, the display screen 116 may be external to the mobile device 102, but communicatively coupled thereto. The mobile device 102, in combination with the display screen 116 (e.g. internal or external to the mobile device 102), may include, but not limited to, a mobile device, a cell phone-type device, a laptop, smart glasses, alternative reality (AR) glasses, virtual reality (VR) glasses and the like. When the mobile device 102, in combination with the display screen 116, is in the form of glasses, the display screen 116 may be integrated with the glasses, with the mobile device 102 controlling the display screen 116, but provided separate from the display screen 116. However, the mobile device 102 and the display screen 116 may both be integrated into glasses. In yet further examples, the display screen 116 may be integrated with the camera 104, such that a technician adjusting the orientation of the camera 104 may view the display screen 116 at the camera 104. In yet further examples, the camera 104 may incorporate the functionality of the mobile device 102 as well as the display screen 116 (e.g. the mobile device 102 may comprise the camera 104 and the display screen 116).

As depicted, the images 114 rendered at the display screen 116 show the road 108 and the road markers 110, but from an angle where images 114 that depict license plates of vehicles would not meet the aforementioned criteria. For example, as depicted, the camera 104 is pointing down onto the road 108 and the license plates of vehicles would not be sufficiently visible in the images 114 and/or the license plates would be at an angle where characters of the license plates would not be readable using license plate reader functionality.

To assist with aiming the camera 104, the mobile device 102 is communicatively coupled to the memory 106 via a wireless communication link. However, in other examples, at least a portion of the memory 106 may be integrated with the mobile device 102. As depicted, the memory 106, which may be provided in the form of a database, stores an "N" number of records 120-1, 120-2 . . . 120-N (e.g. records 120 and/or a record 120) of combinations of road widths, camera distances from respective roads (e.g. respective perpendicular distance from respective closest road markers) and respective camera heights, in association with corresponding camera data 122-1, 122-2 . . . 122-N (e.g. camera data 122 and/or a set of camera data 122).

For simplicity, hereafter, references to a camera distance and/or a distance of a camera from a road is understood to include a perpendicular distance from a closest road marker, however as any suitable distance of a camera from a road is within the scope of the present specification, as long as such distances are measured and/or determined in a consistent manner. For example, all the camera distance in the records 120 may be measured and/or determined as perpendicular distances from a nearest respective road marker, or all the camera distance in the records 120 be measured and/or determined as perpendicular distances from a furthest respective road marker, and such distances may be from one edge of one of the road markers, or to middles of the road markers, or to an edge of a road (e.g., as long as such edges are the same distances from respective road markers). It is further understood that the distance, D, between the camera 104 and the road markers 110 are measured and/or determined in a similar manner as the distances in the records 120.

The camera data 122 comprises data for drawing two virtual road markers on the display screen 116 at fixed positions, that indicate where the road markers 110 depicted in the images 114 would be ideally located at the display screen 116 to identify license plates of vehicles that may be later depicted in the images 114 (e.g. such images 114 would meet the aforementioned criteria). It is further understood that a set of camera data 122 has been predetermined for each respective record 120 of a combination of road width, camera distance from the road (e.g. a perpendicular distance from closest road marker) and a camera height, as is next described.

For example, other cameras mounted adjacent other roads may have been properly aligned with respective road markers, using any suitable technique, and images depicting the respective road markers may have been acquired.

Furthermore, respective road marker width, a distance of a respective camera from respective road markers (and/or a respective road), and a camera height may have been measured and/or determined.

For example, such other cameras may have been aimed at a high traffic road, and such other cameras may have been adjusted (e.g. manually) until images depicting license plates meeting the aforementioned given criteria were acquired. However, to determine whether the images met the aforementioned given criteria, such images may have been processed via a license plate reader application (e.g. which may be machine learning based) at a computer, to determine whether, or not, the aforementioned given criteria was met. Such a process is understood to be time consuming, and while the present specification relies on such previous adjustments at other cameras, aspects of the present specification are to obviate such a process when adjusting the camera 104, such that the images 114 meet the aforementioned criteria.

Once the images from the other cameras meet the aforementioned criteria, such images may be processed to determine positions of road markers in the images, which may include, but are not limited to, lines, and the like, representing the positions of the road markers. Such positions of road markers in the images, such as lines, and the like, are hereafter referred to as virtual road markers. Such virtual road markers may be drawn and/or overlaid on an image as is next described.

For example, as lines may be represented by pairs of coordinates, and/or pairs of points, the virtual road markers in the form of lines may be converted to pairs of points stored in the camera data 122 such that the virtual road markers may be reproduced in other images, such as the images 114.

A set of camera data 122 may hence comprise two pairs of points (e.g. (Pa, Pb) and (Pc, Pd)) to respectively draw two virtual road markers as two lines at the display screen 116 at the fixed positions. A first pair of points (e.g. (Pa, Pb)) is understood to draw a first virtual road marker as a first line at the display screen 116 at a first fixed position, and a second pair of points (e.g. (Pc, Pd)) is understood to draw a second virtual road marker as a second line at the display screen 116 at a second fixed position.

For example, to be independent of display screen resolution and/or image resolution, a point, of a pair of points, may comprise respective fractions of a length and height of an image onto which a respective road marker is to be drawn. For example, a pair of points may be represented as ((0.21, 0.1 h), (0.71, 0.4 h)) indicating that, a line may be drawn onto an image that connects a first point located at a fraction of 0.2 along the length of the image and a fraction of 0.1 along the height of the image, and a second point located at a fraction of 0.7 along the length of the image and a fraction of 0.4 along the height of the image. In some examples the terms "l" and "h" may be omitted and the order of the data in the points may indicate whether a value is a fractional value of a length (e.g. a first value) or a height (e.g. a second value). Such a scheme assumes that a given corner of images is used a starting point and/or (0,0) position, such as a lower left corner of such images (e.g. and presuming images are in an orientation where a top and bottom thereof represents a real life top and bottom, and the like). However, a pair of points may be represented according to any suitable scheme. For example, a top left of images may be used a starting point and/or (0,0) position.

Furthermore, using a pair of points, a line function for a respective virtual road marker may be determined, for example in a standard form of a line of $ax+by+c=0$ where "x" is a variable corresponding to position of a corresponding line along a length of an image, and "y" represents the corresponding height of the line, and "a", "b" and "c are constants determined from the pair of points.

Hence, rather than two pairs of points, a set of camera data 122 may represent pairs of virtual road markers in any suitable manner. For example, rather than pairs of points, pairs of virtual road markers may be represented by constants "a", "b" and "c that represent a standard form of a line of $ax+by+c=0$, again presuming a given corner of images is used a starting point and/or (0,0) position. However, such lines may be alternatively represented using the linear equation form of a line (e.g. $y=mx+d$, where m is slope and d is y-intercept).

Furthermore, a set of camera data 122 is stored in association with a record 120 that stores determined location parameters of a camera that acquired images (e.g. that met the aforementioned criteria) from which the set of camera data 122 was generated. For example, of a respective road width, Wn, a respective distance, Dn, of a camera from the respective road, and a respective height, Hn, of the camera (e.g. where "n" is number from 1 to N, and Wn, Dn, Hn for the respective road width, distance and height of an nth record 120).

For example, the first record 120-1 comprise a first road width W1, a first camera distance D1, and a first height H1, stored in association with a first set of camera data 122-1 comprising two pairs of points (Pa1, Pb1), (Pc1, Pd1). As such, it is understood that the first road width W1, the first camera distance D1, and the first height H1 was determined for a camera that acquired an image that met the aforementioned criteria, and the like, and the two pairs of points (Pa1, Pb1), (Pc1, Pd1) were determined from positions of respective road markers in the image.

Similarly, the second record 120-2 comprise a second road width W2, a second camera distance D2, and a second height H2, stored in association with a second set of camera data 122-2 comprising two pairs of points (Pa2, Pb2), (Pc2, Pd2). As such, it is understood that the second road width W2, the second camera distance D2, and the second height H2 was determined for a camera that acquired an image that met the aforementioned criteria, and the like, and the two pairs of points (Pa2, Pb2), (Pc2, Pd2) were determined from positions of respective road markers in the image.

Similarly, the Nth record 120-N comprise an Nth road width W2, an Nth camera distance D2, and an Nth height H2, stored in association with an Nth set of camera data 122-N comprising two pairs of points (Pa2, Pb2), (Pc2, Pd2). As such, it is understood that the Nth road width W2, the Nth camera distance D2, and the Nth height H2 was determined for a camera that acquired an image that met the aforementioned criteria, and the like, and the two pairs of points (Pa2, Pb2), (Pc2, Pd2) were determined from positions of respective road markers in the image.

It is furthermore understood that the various combinations of road widths, camera distances and camera heights of the records 120 may all be different, though some individual parameters may be the same between the records (e.g. two or more records may include a same road width, but have different respective camera distances and/or different respective camera heights).

A number "N" of records 120 and respective sets of camera data 122 may be any suitable number, however, the processes described herein generally rely on the memory 106 being populated with numbers of records 120 and respective sets of camera data 122 for many different combinations of road widths, camera distances and camera heights. Indeed, as cameras are installed along roads, and properly aimed, respective records 120 and respective sets of camera data 122 may be populated at the memory 106. Herein, the term "properly aimed" is understood to include the camera 104 having an orientation, relative to the road 108, at which the camera 104 acquires images 114 that meet the aforementioned criteria. Indeed, the aforementioned criteria may be summarized as the images 114 having license plates depicted therein, with license plate characters being readable by license plate reader functionality and/or by a license plate reader application.

Returning to the GUI 118, as depicted, the GUI 118 comprises an interactive component 124 (e.g. an electronic button), that may be actuated (e.g. via the touch screen of the display screen 116) to launch a method for assisted aiming of roadside cameras, such as the camera 104. However, the interactive component 124 may be optional and is but one example of how a method for assisted aiming of roadside cameras may be launched at the mobile device 102.

For example, as will be described in more detail with respect to FIG. 4, FIG. 5, FIG. 6 and FIG. 7, such a method for assisted aiming of roadside cameras may include: receiving the road width, W, the camera distance, D and the camera height H of the camera 104 via fields provided at the GUI 118, searching the memory 106 for a record 120 having a closest combination of road width, Wn, camera distance, Dn and camera height, Hn; and retrieving an associated set of camera data 122 from the memory 106. The retrieved camera data 122 may be processed by the mobile device 102 to provide, at the display screen 116, as overlaid on the images 114, two virtual road markers at fixed positions on the display screen 116, representing ideal and/or target positions of the road markers 110 when the camera 104 is properly aimed.

While such virtual road markers (e.g. see virtual road markers 502 in FIG. 5) may be used to aim the camera 104 by adjusting the orientation of the camera 104 (e.g. adjusting the pitch and/or roll and/or yaw) until the virtual road markers (e.g. see virtual road markers 502 in FIG. 5) visually aligned with the road markers 110, such a process may still not result in the camera 104 being properly aimed.

Hence, the method for assisted aiming of roadside cameras may further include, receiving respective indicators of the two road markers 110 in the image 114. For example a user of the mobile device 102 may touch each road marker 110 as depicted at the display screen 116 at two places, such that the respective indicators of the two road markers 110 comprise two points for each of the road markers 110. In particular, the mobile device 102 may receive the respective indicators (e.g. the points) of the two road markers 110 via a touch screen of the display screen 116.

The road markers 110 depicted in the images 114 may be touched (or entered) in any suitable order at the mobile device 102, and, as the first road marker 110-1 is generally below the second road marker 110-2 in the image 114, a first pair of points that is lower on the display screen 116 may be determined, by the mobile device 102, to be associated with the first road marker 110-1, and a second pair of points that is higher on the display screen 116 may be determined, by the mobile device 102, to be associated with the second road marker 110-2.

Furthermore, the respective indicators of the two road markers 110 are pinned to the road markers 110 depicted in the images 114, such that as the orientation of the camera 104 is further adjusted, further images 114 are received, and the road markers 110 move in the further images 114, the respective indicators of the two road markers 110 move with the road markers 110.

Hence, the mobile device 102 is further understood to process the images 114 to determine locations of the road markers 110 using any suitable image and/or video analytics. For example, when the respective indicators of the two road markers 110 are received, the mobile device 102 may search the images 114 for respective portions of the images 114 that correspond to the road markers 110 (e.g. respective lines, respective broken lines, and the like), and associate the respective indicators of the two road markers 110 with such respective portions of the images 114. As such, when respective portions of the images 114 move in the images 114 rendered at the display screen 116, so do the respective indicators of the two road markers 110.

The mobile device 102 further determines when the respective indicators of the two road markers 110 are about aligned with the two virtual road markers overlaid on one or more of further images 114 at the fixed positions using any suitable criteria as described herein, and responsively provides, at the mobile device 102, a notification thereof.

The term "about aligned" may include, but is not limited to, determining that a sum, and/or an average sum, and/or an average mean, and the like, of distances between the points of the respective indicators of the two road markers and respective virtual road markers at the fixed positions on the display screen 116 is within a threshold distance and the like. Such distances and threshold distances may be provided with respect to numbers of pixels of the images 114 at which the respective indicators of the two road markers are rendered and onto which the respective virtual road markers are overlaid. However, such numbers of pixels may depend on a resolution of the images 114. In a particular example, for images having a 1024 by 768 resolution, for the points of the respective indicators of the two road markers and the respective virtual road markers to be aligned, an average distance therebetween may be less than 10 pixels, less than 20 pixels, less than 30 pixels, amongst other possibilities.

However, the term "about aligned" may include any suitable indication of alignment between the respective indicators and the two virtual road markers. For example, the respective indicators and the two virtual road markers may be about aligned when the respective indicators and the two virtual road markers are within 2% of each other, 5% of each other, 10% of each other, amongst other possibilities, for example with respect to a total number of respective pixels along a length and/or height of the images 114. Using 2% as an example, and using an image 114 having a resolution of 1024 by 768 pixels, a point of a respective indicator may be within 2% of a respective line of a virtual road marker when, along the length of the image 114, a distance therebetween is 20 pixels (e.g. 2% of 1024) and when, along the height of the image 114, a distance therebetween is 15 pixels (e.g. 2% of 768).

The notification provided when the respective indicators are about aligned with the two virtual road markers may comprise any suitable notification, such one or more of a visual notification at the GUI 118 and/or the display screen 116 and/or an aural notification provided by a speaker of the mobile device 102 and/or a haptic notification provided by a haptic component of the mobile device 102. Indeed, the notification may be provided by any suitable combination of one or more notification devices of the mobile device 102. Furthermore, it is understood that, when the respective indicators are about aligned with the two virtual road markers, the mobile device 102 may control a notification device to provide the notification.

Figure 2:
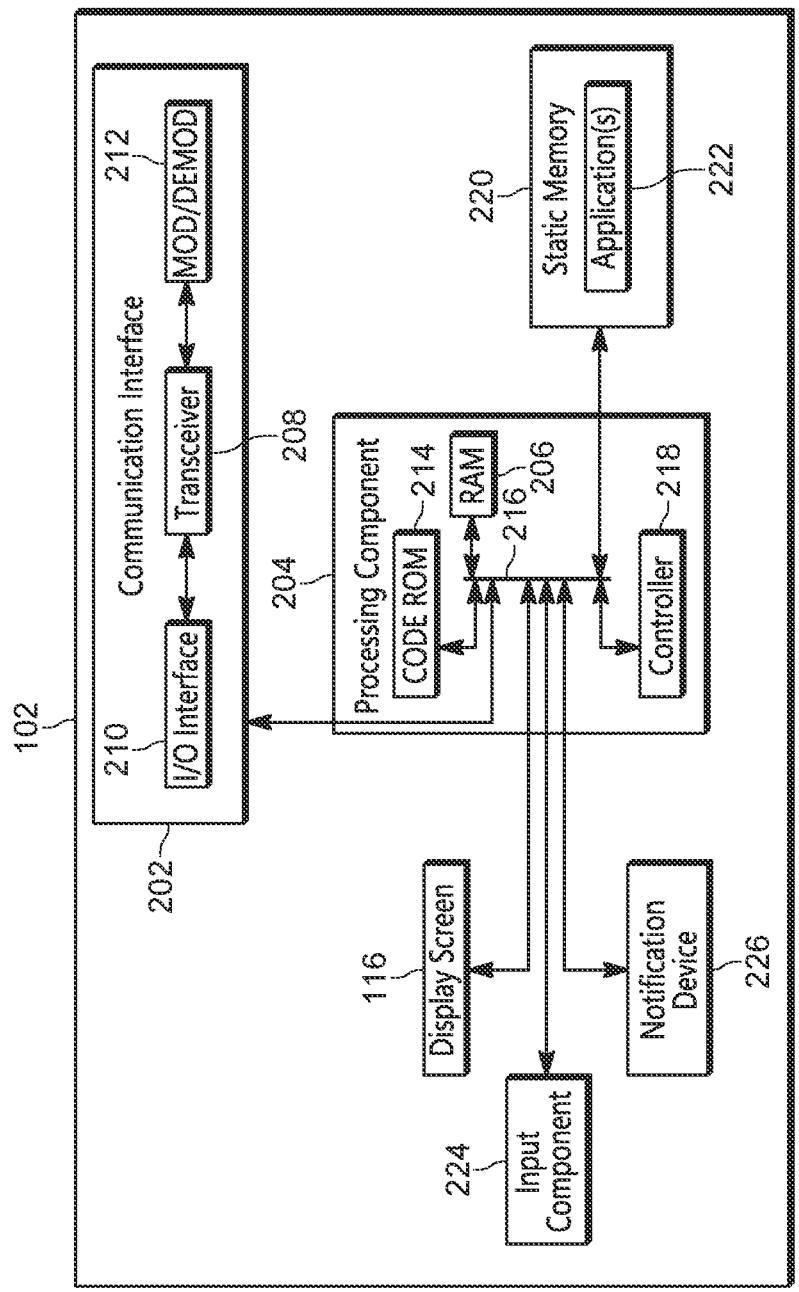
FIG. 2 is a device diagram showing a device structure of a device for assisted aiming of roadside cameras, in accordance with some examples.

Attention is next directed to FIG. 2, which depicts a schematic block diagram of an example of the mobile device 102.

As depicted, the mobile device 102 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the mobile device 102 may have any suitable structure and/or configuration.

As depicted, the mobile device 102 may include the display screen 116, an input component 224 and a notification device 226. For example the input component 224 may include, but is not limited to, a touch screen of the display screen 116, a pointing device, a keyboard (whether virtual or physical) and the like. The notification device 226 may include, but is not limited to, the display screen 116, a speaker, a haptic component, and the like. In some examples, the display screen 116, the input component 224 and the notification device 226 may hence be combined.

As shown in FIG. 2, the mobile device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other suitable components of the system 100.

For example, the communication interface 202 may include one or more transceivers 208 and/or wireless transceivers for communicating with other suitable components of the system 100 such as the camera 104 and the memory 106. Hence, the one or more transceivers 208 may be adapted for communication with one or more communication links and/or communication networks used to communicate with the other components of the system 100. For example, the one or more transceivers 208 may be adapted for communication with one or more of the Internet, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the mobile device 102 is not a generic controller and/or a generic device, but a device specifically configured to implement functionality for assisted aiming of roadside cameras. For example, in some examples, the mobile device 102 and/or the controller 218 specifically comprises a computer executable engine configured to implement functionality for assisted aiming of roadside cameras.

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the mobile device 102 as described herein are maintained, persistently, at the memory 220 and used by the controller 218, which makes appropriate utilization of volatile storage during the execution of such programming instructions.

Figure 3:
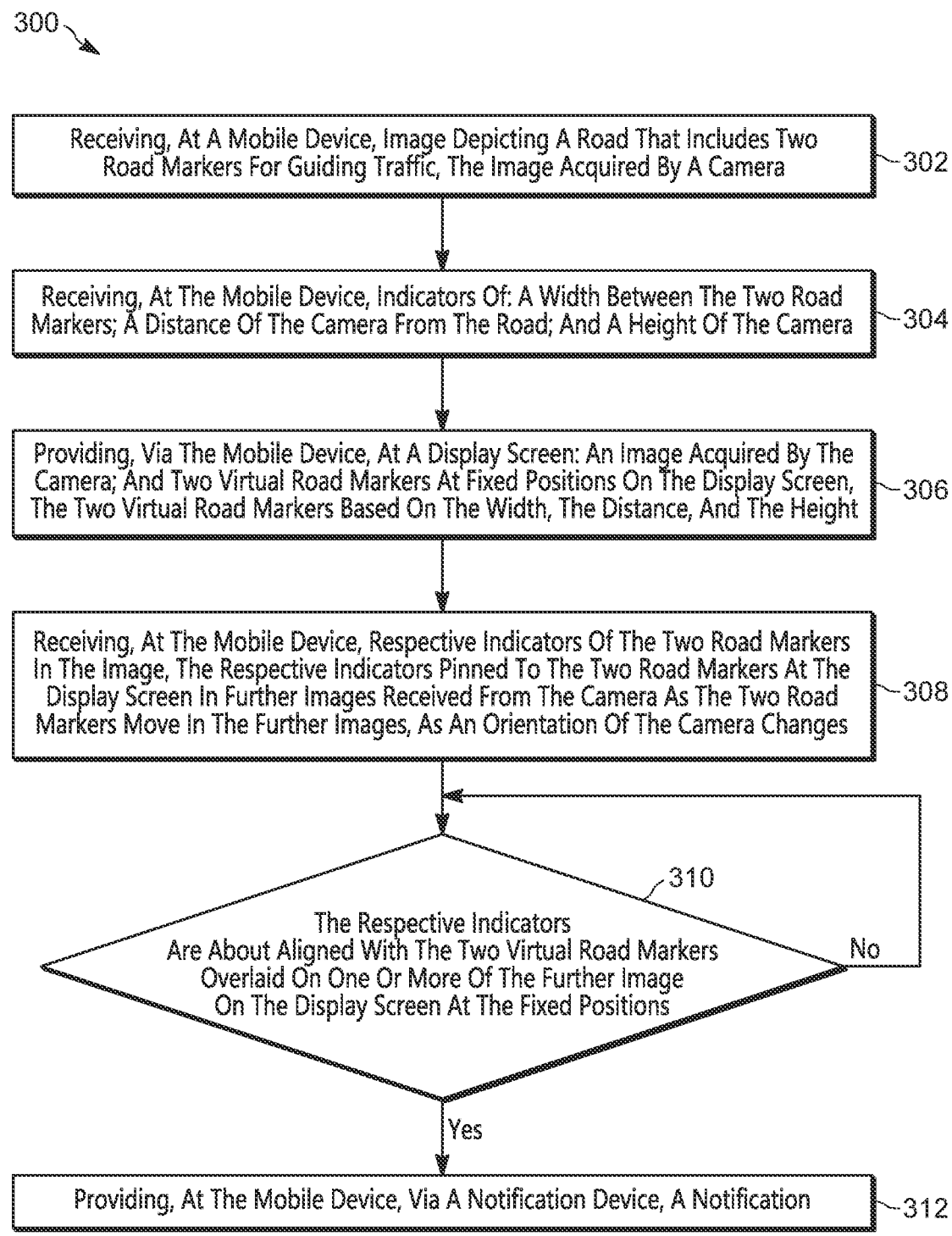
FIG. 3 is a flowchart of a method for assisted aiming of roadside cameras, in accordance with some examples.

In particular, the memory 220 stores instructions and/or program code and/or a set of instructions corresponding to the at least one application 222 that, when executed by the controller 218, enables the controller 218 to implement functionality for assisted aiming of roadside cameras, including but not limited to, the blocks of the method set forth in FIG. 3.

Put another way, the memory 220 may comprise a (e.g. non-transitory) computer-readable storage medium having stored thereon program instructions that, when executed by the controller 218, cause the controller 218 to perform a set of operations comprising the blocks of the method set forth in FIG. 3

The memory 220 may alternatively comprise at least a portion of the memory 106 and hence the memory 220 may store at least a portion of the records 120 and associated camera data 122.

The application 222 may include programmatic algorithms, and the like, to implement functionality as described herein.

Alternatively, and/or in addition to programmatic algorithms, the application 222 may include one or more machine learning algorithms to implement functionality as described herein, for example to at least determine when the respective indicators are about aligned with the two virtual road markers.

The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, the application 222 is understood to include any suitable combination of programmatic and machine learning algorithms to determine where road markers are located in images and to move respective indicators thereof pinned to the road markers as the road markers move in the images.

While components of the camera 104 are not depicted, the camera 104 may have a structure similar to that of the mobile device 102, but adapted for respective functionality of the camera 104. For example, the camera 104 is understood to include an image sensor, such as a CCD (charge-coupled device) a CMOS (complementary metal-oxide semiconductor), and the like. Furthermore, in some examples, the camera 104 may include the display screen 116.

Attention is now directed to FIG. 3, which depicts a flowchart representative of a method 300 for assisted aiming of roadside cameras. The operations of the method 300 of FIG. 3 correspond to machine readable instructions that are executed by the controller 218 and/or mobile device 102. In the illustrated example, the instructions represented by the blocks of FIG. 3 are stored at the memory 220 for example, as the application 222. The method 300 of FIG. 3 is one way in which the controller 218 and/or the mobile device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the mobile device 102, receives images 114 depicting a road 108 that includes two road markers 110 for guiding traffic, the images 114 acquired by a camera 104.

It is understood that prior to the block 302 and/or during implementation of the block 302, the method 300 may further comprise, the controller 218, and/or the mobile device 102: establishing a wireless connection between the mobile device 102 and the camera 104, for example via a wireless communication link therebetween. However, alternatively, the mobile device 102 and the camera 104 may be in wired connection, for example via cable, and the like, therebetween.

Furthermore, receipt of the images 114 may be via the wireless or wired connection between the mobile device 102 and the camera 104, or receipt of the images 114 may be via a cloud server, and the like, (e.g. which may be a component of a wireless communication link between the mobile device 102 and the camera 104). For example, the camera 104 may upload the images 114 to such a cloud server, and the like and the mobile device 102 may download the images 114 from the cloud server, and the like. Indeed, such a cloud server may implement the license plate reader functionality as described herein.

At a block 304, the controller 218, and/or the mobile device 102, receives indicators of: a width W between the two road markers 110; a distance D of the camera 104 from the road 108; and a height H of the camera 104;

For example, the indicators of the width W, the distance D, and the height H may be received via the input component 224 of the mobile device 102, however the indicators of the width W, the distance D, and the height H may be received via the communication interface 202 (e.g. from another device and/or cloud server, and the like, at which the indicators of the width W, the distance D, and the height H were previously stored).

At a block 306, the controller 218, and/or the mobile device 102, provides, at a display screen 116: an image 114 acquired by the camera 104; and two virtual road markers at fixed positions on the display screen 116, the two virtual road markers based on the width W, the distance D, and the height H.

At a block 308, the controller 218, and/or the mobile device 102, receives respective indicators of the two road markers 110 in the image 114, the respective indicators pinned to the two road markers 110 at the display screen 116 in further images 114 received from the camera 104 as the two road markers 110 move in the further images 114, as an orientation of the camera 104 changes.

The respective indicators may be received via a touch screen of the display screen 116, or any suitable input component 224.

At a block 310, the controller 218, and/or the mobile device 102, determines whether or not the respective indicators are about aligned with the two virtual road markers overlaid on one or more of the further images 114 on the display screen 116 at the fixed positions.

When the respective indicators are not about aligned with the two virtual road markers (e.g. a "NO" decision at the block 310), the block 310 may repeat.

When the respective indicators are about aligned with the two virtual road markers (e.g. a "YES" decision at the block 310), at a block 312, the controller 218, and/or the mobile device 102, provides, via a notification device 226, a notification.

Put another way, when the respective indicators are about aligned with the two virtual road markers (e.g. a "YES" decision at the block 310), at the block 312, the controller 218, and/or the mobile device 102, controls the notification device 226 to provide a notification.

In particular, the two virtual road markers are overlaid at the fixed positions on the image 114 (e.g. at the block and the further images 114 on the display screen 116 at the fixed positions.

Furthermore, the two virtual road markers represent target positions for the two road markers 110 in the images 114 provided at the display screen 116.

Furthermore, the respective indicators of the two road markers 110 move at the display screen 116 as the two road markers 110 in the further images 114 move as the orientation of the camera 104 changes.

For example, at the block 310, the controller 218, and/or the mobile device 102, tracks the movement of the respective indicators of the two road markers 110 of the further images 114, and when the respective indicators of the two road markers 110 are about aligned with two virtual road markers that represent target positions for the two road markers 110 in the images 114, at the block 312, the controller 218, and/or the mobile device 102, provides the notification.

The method 300 may include other aspects.

The method 300 may further comprise (e.g. at, or prior to, the block 306), the controller 218, and/or the mobile device 102: retrieving, via the mobile device 102, from the memory 106, the camera data 122 that corresponds to the width W, the distance D, and the height H, the camera data 122 including data for drawing the two virtual road markers on the display screen 116 at the fixed positions.

In some examples, the camera data 122 may include two pairs of points to respectively draw the two virtual road markers as two lines at the display screen 116 at the fixed positions. However, the camera data 122 may be provided in any suitable format, such as "a" "b" and "c" parameters of a line equation in a standard form, and the like.

The method 300 may further comprise, the controller 218, and/or the mobile device 102: determining respective distances between the respective indicators and the two virtual road markers at the display screen 116; and determining that the respective indicators and the two virtual road markers are about aligned when a value representing a combination of the respective distances is below a threshold value.

In particular, the two virtual road markers may comprise two lines at the display screen 116, and the respective indicators may comprise respective pairs of points on the display screen 116. In these examples, the method 300 may further comprise, the controller 218, and/or the mobile device 102: determining respective distances between the points and respective lines of the two lines; and determining that the respective indicators and the two virtual road markers are about aligned when a value representing a combination of the respective distances is below a threshold value.

Aspects of the method 300 are next described with respect to FIG. 4, FIG. 5, FIG. 6, FIG. 7, and FIG. 8, which are substantially similar to FIG. 1, with like components having like numbers. While for simplicity the pitch, roll, and yaw of the camera 104 are not depicted in FIG. 4, FIG. 5, FIG. 6, FIG. 7, and FIG. 8, an orientation of the camera 104 is understood to be adjustable according to at least the pitch, roll, and yaw of the camera 104. Similarly, for simplicity, the road width, W, the camera distance D, and the camera height H are not depicted in FIG. 4, FIG. 5, FIG. 6, FIG. 7, and FIG. 8.

Figure 4:
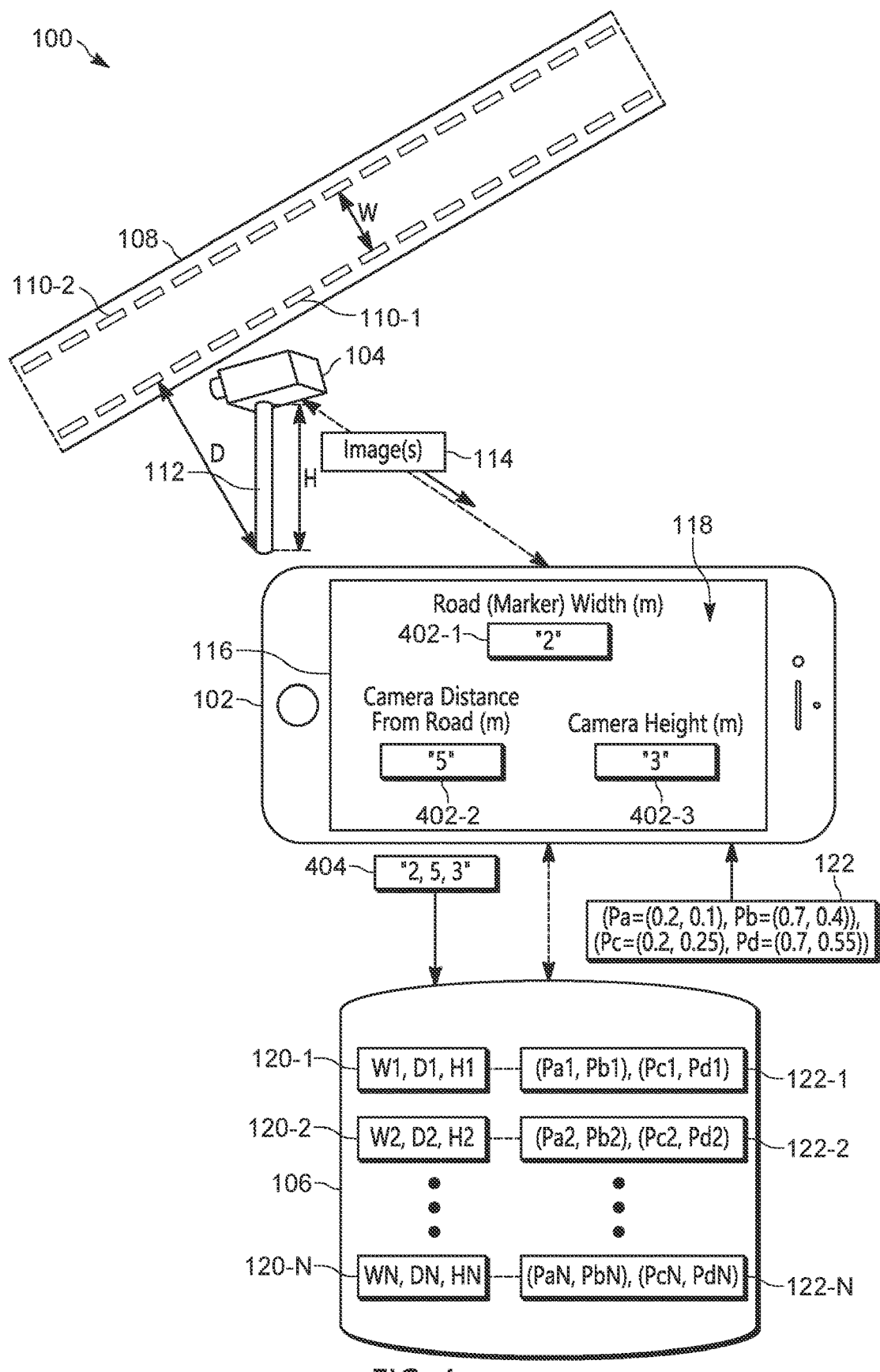
FIG. 4 depicts the system of FIG. 1 implementing a method for assisted aiming of roadside cameras, in accordance with some examples.

Attention is next directed to FIG. 4, which is understood to follow from FIG. 1, for example after actuation of the interactive component 124.

In particular, FIG. 4 depicts the mobile device 102 receiving (e.g. at the block 302 of the method 300) the images 114, similar to as in FIG. 1 (e.g. FIG. 1 may also be an example of the block 302 of the method 300, though receipt of the images 114 may pause after actuation of the interactive component 124).

Indeed, actuation of the interactive component 124 may cause the mobile device 102 to change from an image render mode of the GUI 118, as in FIG. 1, to a parameter entry mode of the GUI 118 as depicted in FIG. 4.

In particular, FIG. 4 further depicts the GUI 118 rendering fields 402-1, 402-2, 402-3 (e.g. fields 402 and/or a field 402) for respectively receiving (e.g. at the block 304 of the method 300) the width W between the two road markers, the distance D of the camera from the road 108, and the height H of the camera. The fields 402 may be rendered in response to actuation of the interactive component 124 and/or upon launching the method 300.

For example, a user of the mobile device 102 may measure the width W, the distance D, and the height H and then enter the width W, the distance D, and the height H at respective fields 402.

As depicted the width W is "2" meters, the distance D is "5" meters, and the height His "3" meters. These parameters 404 are used to search the memory 106 for a record 120 that has closest respective values to a road width of "2", a distance of "5" and a height of "3" using any suitable scheme. For example, the width W, the distance D, and the height H of the parameters 404 may be encoded into a three-dimensional vector, "A" having three components A1, A2, A3 (e.g. and may respectively comprise the width W, the distance D, and the height H of the parameters 404), and, similarly, the widths W, distances D, and heights H of the records 120 may be encoded into three-dimensional vectors "B" having three components B1, B2, B3 (e.g. and, for an nth record, may respectively comprise the width Wn, the distance Dn, and the height Hn of an nth record 120). The vectors A and B may be in Euclidean coordinates (e.g. and in meters, or any other suitable measurement units). Differences between the vectors may be determined from Equation (1):

$$\text{Difference}_n = \sum_{i=1}^{3} w_i |A_i - B_{i,n}| \quad \text{Equation (1)}$$

In Equation (1), "n" is an index to an nth vector determined from an nth record 120 and "i" is an index to the respective three components Ai determined from the parameters 404, and the respective three components Bi determined from the nth record 120. Furthermore, wi is an optional "ith" weight so that vectors corresponding to width, distance, and height may be weighted according to any suitable scheme, For example, the vectors corresponding to width may be weighted lower than the vectors corresponding to distance, and height, and the vectors corresponding to distance may be weighted lower than vectors corresponding to height. In a particular example, w1 (e.g. i=1) may be 0.6, w2 (e.g. i=2) may be 0.8, and w3 (e.g. i=3) may be 0.8. For example, it may have been heuristically determined that camera height has a greater effect on aligning a camera than camera distance, and similarly that camera distance has a greater effect on aligning a camera than road width. However, any suitable weights may be used, and adjusted accordingly as more alignments of cameras occur in the system 100.

Hence, to determine a record 120 that is closest match to the parameters 404, a sum of absolute values of differences between the widths W, distances D, and heights H may be determined from Equation (1), and the record 120 that resulted in the smallest difference may be determined to be a match.

As depicted, an associated set of camera data 122 (e.g. of a matching record 120) is received at the mobile device 102 from the memory 106, the associated set of camera data 122 comprising a first pair of points comprising (Pa, Pb), and a second pair of points comprising (Pc, Pd).

Figure 5:
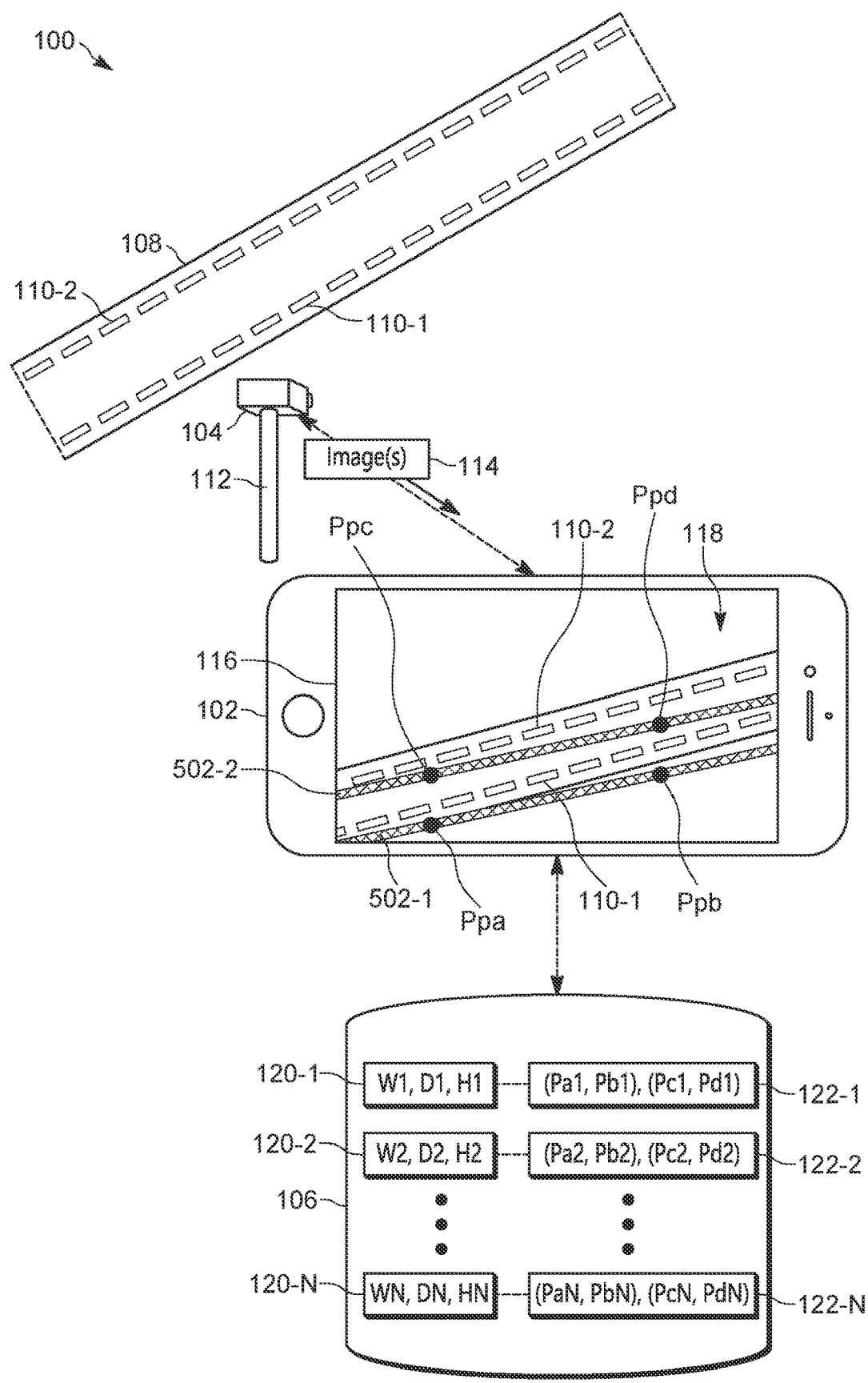
FIG. 5 depicts the system of FIG. 1 continuing to implement a method for assisted aiming of roadside cameras, in accordance with some examples.

Attention is next directed to FIG. 5, which follows from FIG. 4. At FIG. 5, it is understood that the mobile device 102, having received the pair of points of Pa=(0.2, 0.1), Pb=(0.7, 0.4), and the second pair of points of Pc=(0.2, 0.25), Pd=(0.7, 0.5), reverts to a mode of the GUI 118 where the images 114 are again rendered.

It is also seen in FIG. 5, that the orientation of the camera 104 has changed with respect to the road 108, for example such that the camera 104 is now pointed along the road 108, and not pointing down at the road 108 as in FIG. 1. However, the images 114 of the road 108 depicted in FIG. 5 continue to depict the road markers 110.

FIG. 5 further depicts the first pair of points of Pa=(0.2, 0.1), Pb=(0.7, 0.4), and the second pair of points of Pc=(0.2, 0.25), Pd=(0.7, 0.55) (but converted to pixel space as points Ppa, Ppb, Ppc, Ppd, as described below) as being optionally overlaid on the images 114 at the display screen 116 to illustrate that, the mobile device 102 has determined two virtual road markers 502-1, 502-2 (e.g. virtual road markers 502 and/or a virtual road marker 502) and has overlaid the two virtual road markers 502 onto the images 114.

As used herein, the term overlaid is understood to include rendering a virtual component onto an image 114, such as the virtual road markers 502 overlaid on the images 114 as seen in FIG. 5, but without incorporating the virtual component into the image 114. Hence, while the image 114 may change, the virtual component, such as the virtual road markers 502 may remain constant and/or fixed in position relative to the display screen 116.

As depicted, the virtual road markers 502 are in the form of respective lines, though it is understood that the lines of the virtual road markers 502 have been depicted with a width that is similar to the width of the broken lines of the road markers 110, for example to better illustrate the positions of the virtual road markers 502 overlaid on the images 114. The virtual road markers 502 may, however, be depicted in any suitable manner (e.g. as a line of any suitable width, such as 1 pt, 1.2 pts, 1.5 pts, amongst other possibilities).

As depicted, the first pair of points of Pa=(0.2, 0.1), Pb=(0.7, 0.4) and the second pair of points of Pc=(0.2, 0.25), Pd=(0.7, 0.55) may be converted to pixel space using a resolution of the display screen 116 and/or the images 114 of 1068×768 (e.g. for example). For example, "length" values of the points may be multiplied by "1068" and "height" values of the points may be multiplied by "768" to generate a first pair of points in pixel space of the images 114 of Ppa=(214, 77), Ppb=(748, 307) second pair of points in pixel space of the images 114 of Ppc=(214, 192), Ppd=(748, 422).

The first pair of points in pixel space of Ppa=(214, 77), Ppb=(748, 307) may be used to determine a first line function of:

$$a1*x + b1*y + c1 = 0 \qquad \text{Equation (2)}$$

where a1=230, b1=−534, and c1=−8102.

Similarly, second the pair of points in pixel space of Ppc=(214, 192), Ppd=(748, 422) may be used to determine a second line function of $$a2*x + b2*y + c2 = 0 \qquad \text{Equation (3)}$$

where a2=230, b2=−534, and c2=53308.

Equation (2) and Equation (3) may be used by the mobile device 102 and/or the GUI 118 to respectively render the virtual road markers 502-1, 502-3 at the display screen 116.

While in this example, for simplicity, the lines of Equations (2) and (3) are understood to have a same slope (e.g. a1 and a2 are the same, and b1 and b2 are the same), but different y-intercepts (e.g. c1 and c2 are different), and hence the two virtual road markers 502 (e.g. and the road markers 110) understood to be, it is understood that the two virtual road markers 502 (e.g. and the road markers 110) may not be parallel, for example due to a perspective of the camera 104 and/or a perspective of previous cameras that generated images from which the camera data 122 was generated.

It is further understood that, in FIG. 5, the mobile device 102 provides (e.g. at the block 306 of the method 300), at the display screen 116: an image 114 acquired by the camera 104; and two virtual road markers 502 at fixed positions on the display screen 116, the two virtual road markers 502 based on the width, W, the distance, D, and the height, H.

It is further understood that, in the images 114 in FIG. 5, the road markers 110 in the images 114 are not aligned with the two virtual road markers 502 overlaid on the images 114.

Figure 6:
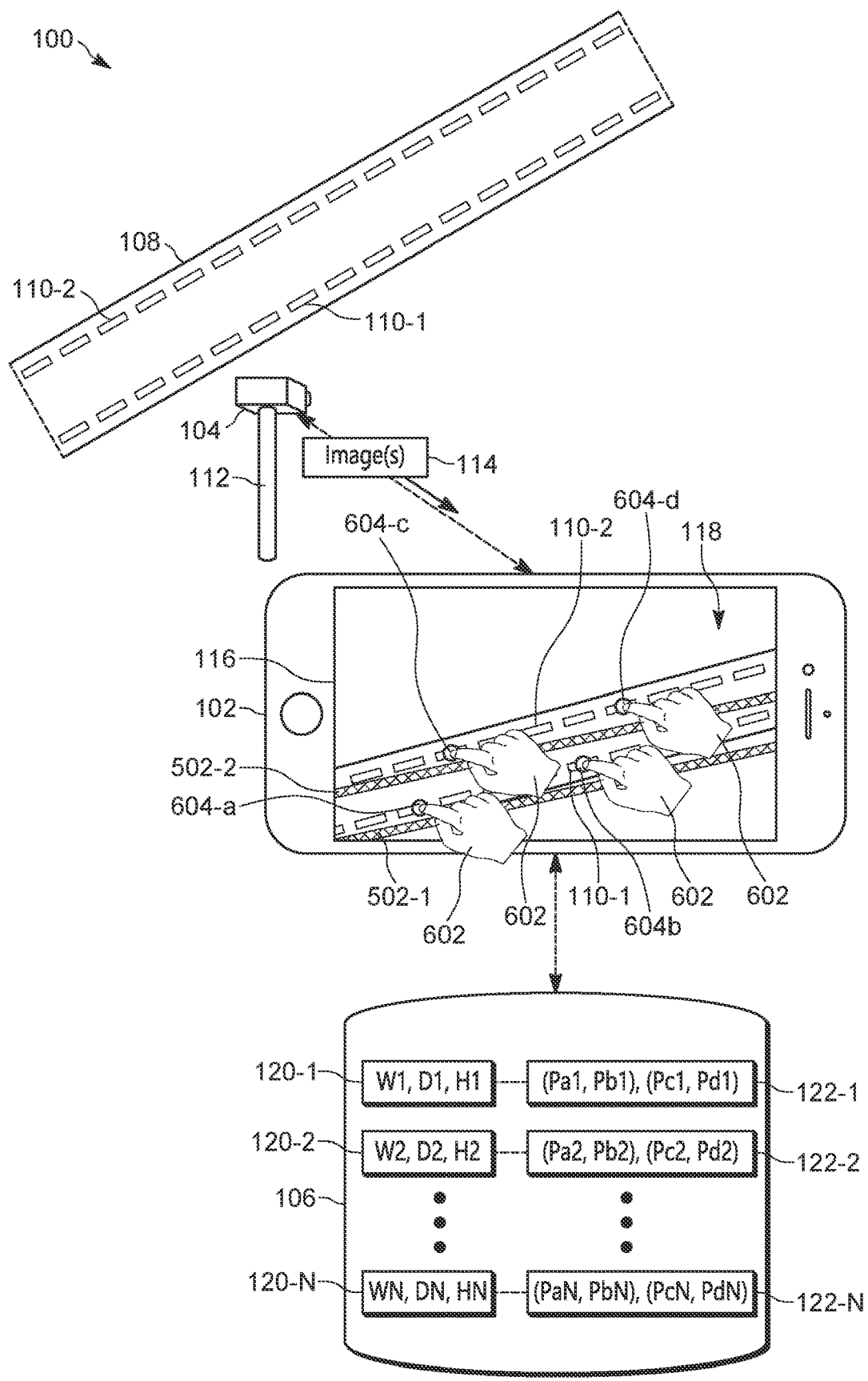
FIG. 6 depicts the system of FIG. 1 continuing to implement a method for assisted aiming of roadside cameras, in accordance with some examples.

Attention is next directed to FIG. 6, which follows from FIG. 5. At FIG. 6, and hereafter, the points Ppa, Ppb, Ppc, Ppd are not depicted for simplicity.

At FIG. 6, a user of the mobile device 102 (e.g. a technician) may use their hand 602 to select two respective points 604-a, 604-b on the first road marker 110-1 in the images 114, and two respective points 604-c, 604-d on the second road marker 110-2 in the images 114, as respective indicators of the road markers 110 in the images 114.

While in present examples two points 604 indicate each respective road marker 110 in the images 114, in other examples, more than two points 604 may be used (e.g. at least two points for each respective road marker 110)

However, respective indicators of the road markers 110 in the images 114 may have any suitable format, including, but not limited to, lines (e.g. one or more respective lines for each road marker 110), areas (e.g. two or more respective areas for each road marker 110), and the like.

Hence, a format of the respective indicators may be any suitable format, and a number of the respective indicators may be any suitable number, that may be used to align the road markers 110 with the virtual road markers 502 as described herein.

The points 604-a, 604-b are understood to be pinned to the first road marker 110-1 in the images 114, and the points 604-c, 604-d are understood to be pinned to the second road marker 110-2 in the images 114.

In particular, the term "pinned" may be understood to include the mobile device 102 maintaining the points 604-a, 604-b at respective positions relative to the first road marker 110-1, as the first road marker 110-1 moves in the images as the orientation of the camera 104 is adjusted, and, similarly, the mobile device 102 maintaining the points 604-c, 604-d at respective positions relative to the second road marker 110-2, as second road marker 110-2 moves in the images as the orientation of the camera 104 is adjusted. Put another way, as features depicted in images at a display screen, indicators pinned to those features also move.

Furthermore, a point, or any other type of indicator of a feature depicted in an image, being pinned to such a feature, is understood to be different from visual components being overlaid onto an image. In particular, visual components that are overlaid onto images do not change or move as the images change, whereas indicators that are pinned to features in the images move with the features as the images change. Nonetheless, indicators that are pinned to features in images are also understood to be not incorporated into the images.

The mobile device 102 may further determine respective coordinates of the points 604 in the images 114 as the locations of the points 604 change, for example using coordinates of pixels.

As such, the mobile device 102 is understood to be configured to determine (e.g. using image and/or video analysis and the like) that the points 604-*a*, 604-*b* are pinned to particular respective portions (e.g. and/or particular respective locations) of the first road marker 110-1 as depicted in the images 114, and that the 604-*c*, 604-d are pinned to particular respective portions (e.g. and/or particular respective locations) on the second road marker 110-2 as depicted in the images 114. The mobile device 102 is further understood to determine the changed positions of the respective portions (and/or locations) of the respective road markers 110 depicted in further images 114, and move the respective points 604 accordingly.

Furthermore, the points 604 may be in pixel space and have a format of (number of pixels along length, number of pixels along height), for example from the origin (0,0) at the lower left corner of the images 114.

FIG. 6 is understood to depict the mobile device 102 receiving (e.g. at the block 308 of the method 300) respective indicators (e.g. the points 604) of the two road markers 110 in the image 114, the respective indicators pinned to the two road markers 110 at the display screen 116 in further images 114 received from the camera 104 as the two road markers 110 move in the further images 114, as an orientation of the camera 104 changes.

Figure 7:
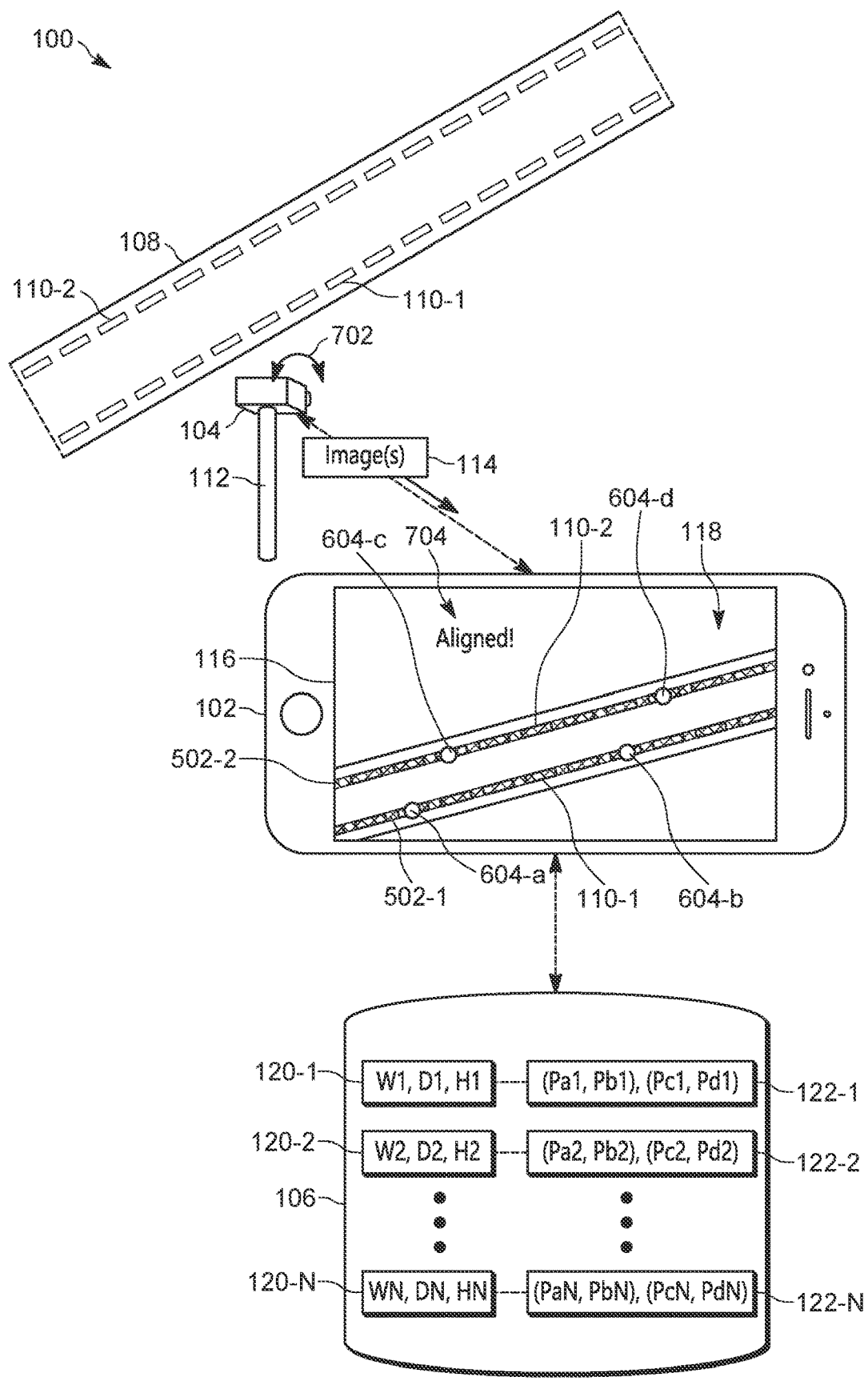
FIG. 7 depicts the system of FIG. 1 continuing to implement a method for assisted aiming of roadside cameras, in accordance with some examples.

Attention is next directed to FIG. 7, which follows from FIG. 6. As depicted, an orientation of the camera 104 continues to be changed as indicated by the arrow 702, and the mobile device 102 continues to receive further images 114 from the camera 104. For example, a technician and/or user of the mobile device 102 may look at the display screen 116 and attempt to change the orientation of the camera 104 to better align the points 604 with respective virtual road markers 502. However, such a technician/user cannot determine when the images 114 meet the aforementioned criteria. As such, as the images 114 change, the mobile device 102 may determine a distance between a point 604 and a given (e.g. closest) virtual road marker 502.

In particular, for the images 114 to meet the aforementioned criteria, the points 604*a*, 602*b* are to be aligned with the first virtual road marker 502-1, and the points 604*c*, 602*d* are to be aligned with the second virtual road marker 502-2.

Hence, to determine when the points 604 are about aligned with the two virtual road markers 502 overlaid the further images 114 on the display screen 116, the mobile device 102 may determine the coordinates of the points 604 for a given image 114 and further determine a distance of a given point 604 to a respective virtual road marker 502.

For example, to determine a distance of a given point 604 to a respective virtual road marker 502, Equation (4) may be used:

$$d_i(x_i, y_i, a, b, c) = \frac{|ax_i + by_i + c|}{\sqrt{a^2 + b^2}} \qquad \text{Equation (4)}$$

In Equation (4), $x_i$ and $y_i$ are the coordinates of an $i^{th}$ given point 604, and "a", "b", and "c", are respectively from the Equation (2) or Equation (3), Indeed, for an $i^{th}$ given point 604, whether "a1", "b1", and "c1" from Equation (2) are used in Equation (4), or whether "a2", "b2", and "c2" from Equation (3) are used in Equation (4) generally depends on with which of the virtual road markers 502 and/or with which of the road markers 110 the $i_{th}$ given point 604 is associated. For example, "a1", "b1", and "c1" may be used with the points 604-*a*, 604-*b*, and "a2", "b2", and "c2" may be used with the points 604-*c*, 604-d.

Hence, for the points 604*a*, 604*b*, respective distances therefrom to the virtual road marker 502-1 may be determined using "a1", "b1", and "c1" from Equation (2), and the respective locations (x, y) of the points 604*a*, 604*b* (e.g. in pixel space). Similarly, for the points 604*c*, 604*d*, a respective distances therefrom to the virtual road marker 502-2 may be determined using "a2", "b2", and "c2" from Equation (3), and the respective locations (x, y) of the points 604*c*, 604*d* (e.g. in pixel space).

An average distance, davg, may be determined by summing the four distances determined from Equation (4), and dividing by four to get an average distance (e.g. as a number of pixels).

The average distance, davg, may be compared to a threshold distance, such as, for an image resolution of 1064×768 pixels, of 20 pixels. In this example, when the average distance, davg, is greater than 20 pixels, the mobile device 102 determines that the points 604 are not about aligned with the virtual road markers 502 (e.g. a "NO" decision at the block 310 of the method 300), and continues to determine the average distance, davg, as the positions of the points 604 change in further images 114 as the orientation of the camera 104 continues to be adjusted (e.g. the block 310 of the method 300 repeats).

However, as depicted in FIG. 7, when the average distance, davg, is 20 pixels or fewer, the mobile device 102 determines that the points 604 are about aligned with the virtual road markers 502 (e.g. a "YES" decision at the block 310 of the method 300). As such, the mobile device 102 provides (e.g. at the block 312 of the method 300), a notification 704 (e.g. text of "Aligned"). The user of the mobile device 102 is hence informed that the camera 104 is properly aimed and may fix the orientation of the camera 104 accordingly (e.g. using any suitable fasteners, and the like).

Indeed, FIG. 7 specifically depicts the points 604 about aligned with the virtual road markers 502.

Put another way, FIG. 7 is an example of respective indicators of the block 310 of the method 300 being about aligned with the two virtual road markers 502 overlaid on one or more of the further images 114 on the display screen 116 at the fixed positions, as well as the providing a notification of the block 312 of the method 300.

Figure 8:
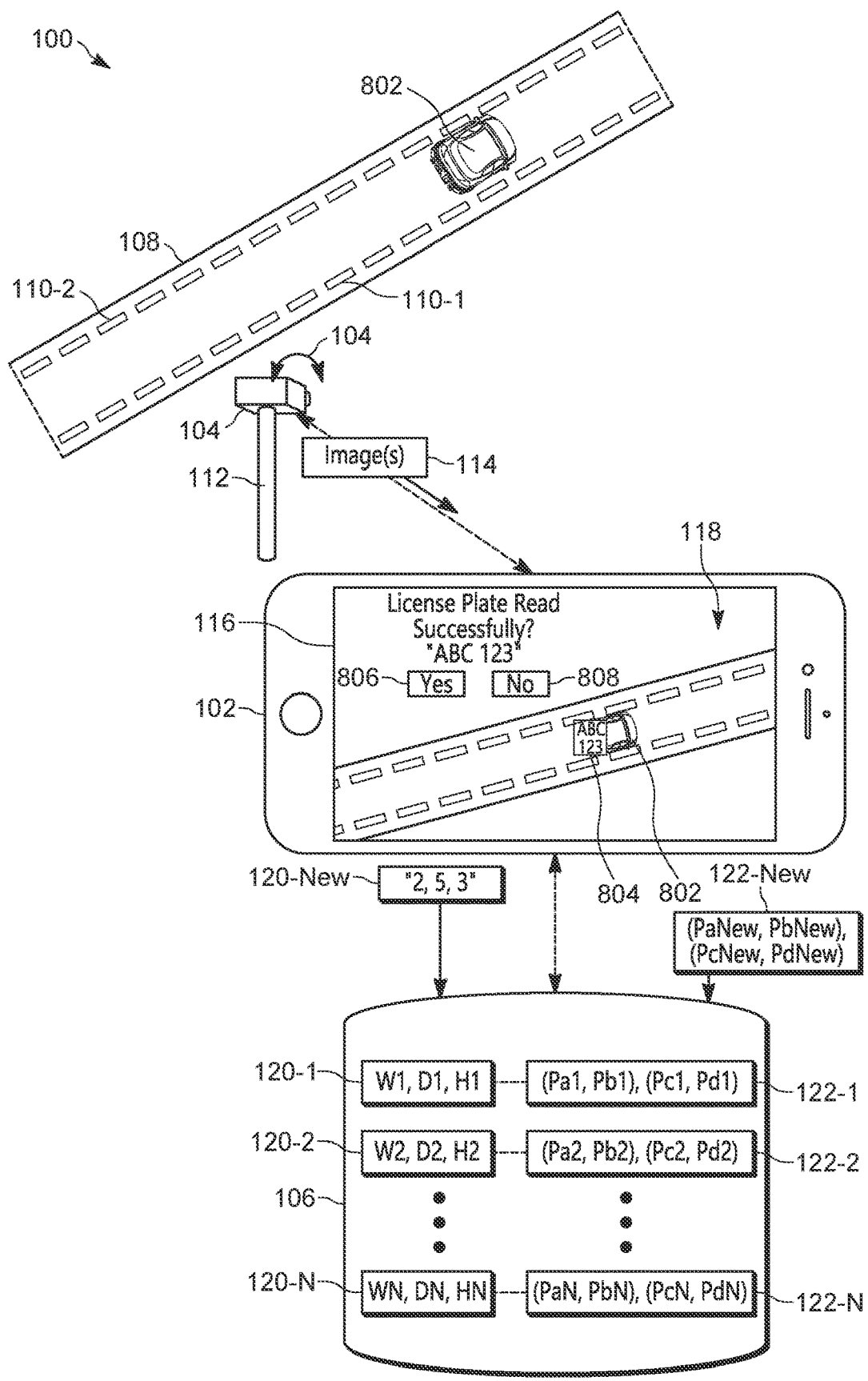
FIG. 8 depicts the system of FIG. 1 acquiring images of a vehicle after implementing a method for assisted aiming of roadside cameras, in accordance with some examples.

Attention is next directed to FIG. 8, which depicts the mobile device 102 receiving images 114 from the camera 104 at the orientation determined in FIG. 7. However, in the images 114, a vehicle 802 is moving along the road 108 and hence the vehicle 802 is also depicted in the images 114 depicted at the display screen 116. While a size and angle of a license plate 804 of the vehicle 802 is exaggerated in the images 114 depicted at the display screen 116, it is understood that, due to the implementation of the method 300 as described with respect to FIG. 4, FIG. 5, FIG. 6, and FIG. 7, the characters of the license plate 804 are readable in the images 114, at least by processing the image 114 using a license plate reader application, and the like. For example, the images 114 may be uploaded to a cloud server by the camera 104, and license plate characters of the license plate 804 may be extracted accordingly. Indeed, As also depicted in FIG. 8, the mobile device 102 may be implementing a license plate application that process the images 114 to extract license plate characters of "ABC 123"

and render them in the GUI 118, along with interactive components 806, 808 that enables a user of the mobile device 102 to confirm that the extracted license plate characters are the same as those of the license plate 804. Alternatively, the extracted license plate characters of "ABC 123" may be received from a cloud server that extracts the license plate characters from the images 114.

As depicted, a text of "License Plate Read Successfully?" prompts a user to actuate one of the interactive components 806, 808. Actuation of the interactive component 806 of "YES" indicates that the extracted license plate characters are the same as those of the license plate 804, and actuation of the interactive component 808 of "NO" indicates that the extracted license plate characters are not the same as those of the license plate 804.

Presuming the interactive component 806 of "YES" is actuated, the parameters 404 may be used to generate a new record 120-New, and values of the coordinates of the points 604a, 602b, 602c, 602d (e.g. respectively, (PaNEW), (PbNEW), (PcNEW), (PdNEW), but converted to fractions of the images 114 from pixel space) determined when the points 604 are about aligned with the virtual road markers 502 may be used to generate new associated camera data 122-New.

The new record 120-New and new associated camera data 122-New may, as depicted, be provided to, and stored at, the memory 106. Hence, in examples where the parameters 404 did not exactly match any of the existing records 120 (e.g. Equation (1) resulted in a non-zero value), the new record 120-New and new associated camera data 122-New may be stored at the memory 106 for use in installing other cameras having the same or similar parameters 404.

Furthermore, actuation of the interactive component 806 may cause the mobile device 102 to generate positive training data for training any machine learning algorithms of the application 222 to better determine when respective indicators of the block 310 of the method 300 are about aligned with two virtual road markers, and the like.

Similarly, actuation of the interactive component 808 may cause the mobile device 102 to generate negative training data for training any machine learning algorithms of the application 222 to better determine when respective indicators of the block 310 of the method 300 are about aligned with two virtual road markers, and the like.

The positive or negative training data may be used to train any machine learning algorithms of the application 222 in a training mode, for example in a machine learning feedback loop.

Such training may occur at the mobile device 102, and/or such training may occur in a cloud server, and the like. In the latter example, the images 114 acquired, and data indicative of the two virtual road markers 502 as well as the values of the coordinates of the points 604a, 604b, 604c, 604d determined when the points 604 were about aligned with the virtual road markers 502, and labelled as positive or negative training data, may be uploaded to the cloud server. The cloud server may perform the training to better train a copy of the machine learning applications stored at the cloud server and, once trained, provide the better trained machine learning applications to the mobile device 102 (e.g. and other mobile devices also implementing the method 300). However, such training may occur at the mobile device 102.

In some examples, when actuation of the interactive component 808 occurs, the mobile device 102 may provide a command to the memory 106, that flags the record 120 and associated camera data 122 used to render the virtual road markers 502 as being potentially bad data. Such a flag may indicate to an administrator of the system 100 to analyze the record 120 and associated camera data 122, as well as images from other cameras where the record 120 and associated camera data 122 were used for aiming such other cameras, for example in the event that such images do not meet the aforementioned criteria. Alternatively, or in addition, such a command may cause use of the record 120 and associated camera data 122 to be at least temporarily paused (e.g. not used in other implementations of the method 300 until analyzed) and/or such a command may cause the record 120 and the associated camera data 122 to be deleted from the memory 106.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot generate a GUI programmed for certain features, cannot generate interactive components of a GUI, cannot determine when images meet certain criteria such as whether or not image characters are greater than a given pixel size, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a mobile device, images depicting a road that includes two road markers for guiding traffic, the images acquired by a camera;

receiving, at the mobile device, indicators of: a width between the two road markers; a distance of the camera from the road; and a height of the camera;

providing, via the mobile device, at a display screen: an image acquired by the camera; and two virtual road markers at fixed positions on the display screen, the two virtual road markers based on the width, the distance, and the height;

receiving, at the mobile device, respective indicators of the two road markers in the image, the respective indicators pinned to the two road markers at the display screen in further images received from the camera as the two road markers move in the further images, as an orientation of the camera changes, wherein the respective indicators of the two road markers are received as manual input at one or more of the mobile device and the display screen; and as the orientation of the camera changes:
receiving, at the mobile device, the further images from the camera;
overlaying, at the mobile device, onto the further images, the two virtual road markers at the fixed positions on the display screen;
as the two road markers at the display screen move in the further images: moving the respective indicators of the two road markers such that the respective indicators remained pinned to the two road markers; and maintaining the two virtual road markers at the fixed positions on the display screen; and
when the respective indicators are about aligned with the two virtual road markers, overlaid on one or more of the further images on the display screen at the fixed positions, providing, at the mobile device, a notification.

2. The method of claim 1, wherein the indicators of the width, the distance, and the height are received via an input component of the mobile device.

3. The method of claim 1, further comprising:
retrieving, via the mobile device, from a memory, camera data that corresponds to the width, the distance, and the height, the camera data including data for drawing the two virtual road markers on the display screen at the fixed positions.

4. The method of claim 3, wherein the camera data includes two pairs of points to respectively draw the two virtual road markers as two lines at the display screen at the fixed positions.

5. The method of claim 1, wherein the two virtual road markers represent target positions for the two road markers in the images provided at the display screen.

6. The method of claim 1, further comprising:
determining respective distances between the respective indicators and the two virtual road markers at the display screen; and
determining that the respective indicators and the two virtual road markers are about aligned when a value representing a combination of the respective distances is below a threshold value.

7. The method of claim 1, wherein the two virtual road markers comprise two lines at the display screen, and the respective indicators comprise respective pairs of points on the display screen, and the method further comprises:
determining respective distances between the points and respective lines of the two lines; and
determining that the respective indicators and the two virtual road markers are about aligned when a value representing a combination of the respective distances is below a threshold value.

8. The method of claim 1, further comprising: establishing a wireless connection between the mobile device and the camera.

9. A mobile device comprising:
a communication interface;
a controller; and
a computer-readable storage medium having stored thereon program instructions that, when executed by the controller, cause the controller to perform a set of operations comprising:
receiving, via the communication interface, images depicting a road that includes two road markers for guiding traffic, the images acquired by a camera;
receiving indicators of: a width between the two road markers; a distance of the camera from the road; and a height of the camera;
providing, at a display screen: an image acquired by the camera; and two virtual road markers at fixed positions on the display screen, the two virtual road markers based on the width, the distance, and the height;
receiving respective indicators of the two road markers in the image, the respective indicators pinned to the two road markers at the display screen in further images received from the camera as the two road markers move in the further images, as an orientation of the camera changes, wherein the respective indicators of the two road markers are received as manual input at one or more of the mobile device and the display screen; and
as the orientation of the camera changes:
receiving, at the mobile device, the further images from the camera;
overlaying, at the mobile device, onto the further images, the two virtual road markers at the fixed positions on the display screen;
as the two road markers at the display screen move in the further images: moving the respective indicators of the two road markers such that the respective indicators remained pinned to the two road markers; and maintaining the two virtual road markers at the fixed positions on the display screen; and
when the respective indicators are about aligned with the two virtual road markers overlaid on one or more of the further images on the display screen at the fixed positions, providing a notification.

10. The mobile device of claim 9, further comprising an input component, and the indicators of the width, the distance, and the height are received via the input component.

11. The mobile device of claim 9, wherein the set of operations further comprise:
retrieving, from a memory, camera data that corresponds to the width, the distance, and the height, the camera data including data for drawing the two virtual road markers on the display screen at the fixed positions.

12. The mobile device of claim 11, wherein the camera data includes two pairs of points, and the set of operations further comprise: respectively drawing the two virtual road markers as two lines at the display screen at the fixed positions using the two pairs of points.

13. The mobile device of claim 9, wherein the two virtual road markers represent target positions for the two road markers in the images provided at the display screen.

14. The mobile device of claim 9, wherein the set of operations further comprise:
   determining respective distances between the respective indicators and the two virtual road markers at the display screen; and
   determining that the respective indicators and the two virtual road markers are about aligned when a value representing a combination of the respective distances is below a threshold value.

15. The mobile device of claim 9, wherein the two virtual road markers comprise two lines at the display screen, and the respective indicators comprise respective pairs of points on the display screen, and the set of operations further comprise:
   determining respective distances between the points and respective lines of the two lines; and
   determining that the respective indicators and the two virtual road markers are about aligned when a value representing a combination of the respective distances is below a threshold value.

16. The mobile device of claim 9, wherein the set of operations further comprise: establishing a wireless connection between the mobile device and the camera.

* * * * *